United States Patent
Komukai et al.

(10) Patent No.: US 9,938,459 B2
(45) Date of Patent: Apr. 10, 2018

(54) ALKALINE EARTH METAL SILICATE PHOSPHOR AND METHOD FOR PRODUCING SAME

(71) Applicants: SUMITOMO METAL MINING CO., LTD., Tokyo (JP); TOHOKU UNIVERSITY, Sendai-shi, Miyagi (JP)

(72) Inventors: Tetsufumi Komukai, Chiba (JP); Jun Yokoyama, Chiba (JP); Masato Kakihana, Miyagi (JP); Satoko Tezuka, Miyagi (JP); Hideki Kato, Miyagi (JP)

(73) Assignees: SUMITOMO METAL MINING CO., LTD, Tokyo (JP); TOHOKU UNIVERSITY, Sendai (JP)

( * ) Notice: Subject to any disclaimer, the term of this patent is extended or adjusted under 35 U.S.C. 154(b) by 14 days.

(21) Appl. No.: 14/416,410

(22) PCT Filed: Jun. 17, 2013

(86) PCT No.: PCT/JP2013/066588
§ 371 (c)(1),
(2) Date: Jan. 22, 2015

(87) PCT Pub. No.: WO2014/021006
PCT Pub. Date: Feb. 6, 2014

(65) Prior Publication Data
US 2015/0203749 A1    Jul. 23, 2015

(30) Foreign Application Priority Data

Jul. 30, 2012 (JP) ................. 2012-168795
Nov. 28, 2012 (JP) ................. 2012-259996

(51) Int. Cl.
C09K 11/59        (2006.01)
C09K 11/77        (2006.01)

(52) U.S. Cl.
CPC ................. *C09K 11/7734* (2013.01)

(58) Field of Classification Search
CPC ................. C09K 11/7734
See application file for complete search history.

(56) References Cited

U.S. PATENT DOCUMENTS

| | | |
|---|---|---|
| 2004/0104391 A1 | 6/2004 | Maeda et al. |
| 2005/0082574 A1 | 4/2005 | Tasch et al. |
| 2006/0028122 A1 | 2/2006 | Wang et al. |
| 2008/0017831 A1* | 1/2008 | Tamatani ............ C01B 33/24 252/301.4 R |
| 2012/0199865 A1* | 8/2012 | Winkler ............ C09K 11/7734 257/98 |

FOREIGN PATENT DOCUMENTS

| | | | |
|---|---|---|---|
| JP | S56-82876 | A | 7/1981 |
| JP | 2000-244021 | A | 9/2000 |
| JP | 2005-187797 | A | 7/2005 |
| JP | 2006-008721 | A | 1/2006 |
| JP | 2008-024791 | A | 2/2008 |
| JP | 2009-173905 | * | 8/2009 |
| JP | 2009-173905 | A | 8/2009 |
| JP | 2012-136594 | * | 7/2012 |
| JP | 2012-136594 | A | 7/2012 |
| WO | 03/021691 | A1 | 3/2003 |
| WO | WO 2011/044974 | * | 4/2011 |

OTHER PUBLICATIONS

"Hakusyoku LED Syomei-gijutsu No Subete," p. 107, Kogyo Chosakai Publishing Co., Ltd.
Barry, T.L, "Fluorescence of Eu2+-Activated Phases in Binary Alkaline Earth Orthosilicate Systems," J. Electrochem. Soc., Nov. 1968, pp. 1181-1184, vol. 115, No. 11.
Aug. 13, 2013 International Search Report issued in International Application No. PCT/JP2013/066588.
Feb. 26, 2016 extended Search Report issued in European Patent Application No. 13825735.7.

* cited by examiner

*Primary Examiner* — C Melissa Koslow
(74) *Attorney, Agent, or Firm* — Oliff PLC

(57) ABSTRACT

An object of the present invention is to provide: an alkaline earth metal silicate phosphor to which Eu is added as an activator, and which has an emission peak wavelength of 600 nm or more, high luminance and excellent color rendering properties; and a method for producing the alkaline earth metal silicate phosphor. An alkaline earth metal silicate phosphor of the present invention is represented by composition formula (1) and having an emission peak wavelength of 600 nm or more and a circularity of 85% or more. Composition formula (1): $(Sr_aCa_bBa_cEu_d)_2Si_eO_f$ (in the formula, a, b, c, d, e and f satisfy $0.4<a<0.6$, $0.4<b<0.6$, $0.01<c<0.05$, $0.01\leq d<0.4$, $0.7\leq e\leq 1.3$, $3.0\leq f\leq 5.0$ and $a+b+c+d=1$).

4 Claims, 4 Drawing Sheets

ALKALINE EARTH METAL SILICATE PHOSPHOR AND METHOD FOR PRODUCING SAME

TECHNICAL FIELD

The present invention relates to an alkaline earth metal silicate phosphor and a method for producing the alkaline earth metal silicate phosphor, more specifically, relates to an alkaline earth metal silicate phosphor suitable as a red phosphor which is used for illumination, a display or the like, and which emits fluorescence having a high luminance by a near ultra violet light to a blue light, and a method for producing the alkaline earth metal silicate phosphor. This application claims priority on the basis of Japanese Patent Application No. 2012-168795 filed on Jul. 30, 2012, and Japanese Patent Application No. 2012-259996 filed on Nov. 28, 2012 in Japan, which are hereby incorporated by reference.

BACKGROUND ART

A white LED emits a white light by mixing luminescences from a near ultra violet or blue LED and a phosphor. Conventionally, development and research have been vigorously made of the white LED as an LCD backlight light source for a small size portable device or the like, while expansion to an illumination application thereof as a next-generation application advances.

In the backlight application or the like, a so-called pseudo white has been widely used in which a blue LED and an YAG:$Ce^{3+}$ are used in combination. However, the white light obtained by this combination has a problem that the color rendering property is low when used for illumination due to the lack of red components. In order to improve this point, a white LED with the use of a blue LED along with a green or yellow phosphor and a red phosphor is proposed. In addition, as a white LED having a higher color rendering is also proposed a white LED with the use of a near ultra violet to violet LED along with blue, green and red phosphors in a combined system.

As an example of the red phosphor used for these white LEDs, nitride phosphor such as CaAlSiN$_3$:Eu or (Sr, Ca)AlSiN$_3$ (e.g., refer to Patent Literature 1 or 2), or a sulfide phosphor such as CaS:Eu, SrS:Eu or (Ca, Sr)S:Eu (e.g., refer to Patent Literature 3) is proposed.

Although the nitride phosphor has a high performance, a producing step is required of performing annealing at a high temperature of around 2,000° C. under a nitrogen pressurized atmosphere, which makes the production difficult and requires a special facility. In addition, although the sulfide phosphor is relatively easily produced, there is a problem in that the production involves generation of a bad smell, or corrosion of a wiring material such as Ag or Cu caused by sulfur generated through decomposition.

In addition, these nitride phosphor and sulfide phosphor have an excitation spectrum extending to a long wavelength side, so that when a white LED is prepared by mixing them with a yellow to green phosphor, there is also a problem in that they are easy to reabsorb light emitted from the green to yellow phosphor and then emit light, that is, a so-called multistage excitation is easy to occur. When such red phosphors are used and mixed with a green or yellow phosphor and a blue excitation is made, there easily arises unevenness in color, or deterioration of the luminous efficiency of the white LED. In order to reduce the effect of such a multistage excitation, a structure in which fluorescent layers are layered or separated is proposed. However, there is a problem in that a producing step for a white LED is complicated.

As one of phosphors other than the nitride phosphor and the sulfide phosphor, a europium (Eu)-activated alkaline earth metal silicate phosphor is known. For example, (Sr, Ba)$_2$SiO$_4$:Eu is well-known. Such an alkaline earth metal silicate phosphor is widely used, because of the characteristics that the production is relatively easy but does not require a special producing facility, and adjustment of the emission wavelength is possible in accordance with the Ba/Sr ratio.

However, in such alkaline earth metal silicate phosphors, the one having an emission peak wavelength of more than 600 nm is not known. A conventional alkaline earth metal silicate phosphor has too short wavelength to be used as a red phosphor (e.g., refer to Non Patent Literature 2).

In addition, in Patent Literature 4 is disclosed a phosphor having a composition of (Sr$_x$, Ba$_y$, Ca$_z$, Eu$_w$)$_2$SiO$_4$:Eu, which emits light having a long wavelength of 600 nm or more by a blue excitation. However, it is defined that, in order to prevent an increase in the moisture absorption, the adding amount of a crystal grower is restricted to 0.01% by weight or more but 0.3% by weight or less with respect to a whole base powder. In such a case, there are problems in that not only the crystal growth occurs insufficiently to produce a practically sufficient luminance, but also the obtained phosphor has a so deformed shape that, when the phosphor is mixed in resin for the production of a white LED element, there easily arises ununiformity or unevenness.

CITATION LIST

Patent Literature

Patent Literature 1: JP 2000-244021 A
Patent Literature 2: JP 2006-008721 A
Patent Literature 3: JP S56-82876 A
Patent Literature 4: JP 2008-24791 A

Non Patent Literature

Non Patent Literature 1: Hakusyoku LED Syomei-gijutsu No Subete (in Japanese) (Light emitting diode), Kogyo Chosakai Publishing Co., Ltd., p 107
Non Patent Literature 2: T. L. Barry J. Electrochem. Soc. 115 (1968) 1181-1184

SUMMARY OF INVENTION

Technical Problem

Accordingly, the present invention has been proposed in view of such actual circumstances, and has as an object to provide an alkaline earth metal silicate phosphor to which Eu is added as an activator, and which has an emission peak wavelength of 600 nm or more, a high circularity of particle, a high luminance and an excellent color rendering property, and a method for producing the alkaline earth metal silicate phosphor.

Solution to Problem

As a result of intensive studies made by the present inventors to solve the above described problems, it has been found that an alkaline earth metal silicate phosphor composed of a predetermined composition obtained by performing a firing process in the presence of a flux including at least barium chloride ($BaCl_2$) has an emission peak wavelength of more than 600 nm, a high circularity of particle suitable for a white LED, and a higher fluorescent luminance than that of a conventional phosphor, and thus the present invention has been achieved.

That is, according to the present invention, an alkaline earth metal silicate phosphor is represented by the following composition formula (1) and has an emission peak wavelength of 600 nm or more and a circularity of particle of 85% or more.

  Composition formula (1)

(in the formula, a, b, c, d, e and f satisfy $0.4<a<0.6$, $0.4<b<0.6$, $0.01<c<0.05$, $0.01\leq d<0.4$, $0.7\leq e\leq 1.3$, $3.0\leq f\leq 5.0$ and $a+b+c+d=1$).

Herein, at least a part of barium (Ba) that is a component of the alkaline earth metal silicate phosphor is derived from a flux including barium chloride which is to be mixed at the time of firing.

In addition, an emission peak intensity excited at a wavelength by which the maximum excitation intensity is obtained ($I_{max}$) and an emission peak intensity at an excitation wavelength of 550 nm ($I_{ex550\ nm}$) are satisfying a relationship of $(I_{ex550\ nm})/(I_{max})<0.25$.

In addition, according to the present invention, a method for producing an alkaline earth metal silicate phosphor is represented by composition formula (1): $(Sr_aCa_bBa_cEu_d)_2Si_eO_f$; wherein a, b, c, d, e and f satisfy $0.4<a<0.6$, $0.4<b<0.6$, $0.01<c<0.05$, $0.01\leq d<0.4$, $0.7\leq e\leq 1.3$, $3.0\leq f\leq 5.0$ and $a+b+c+d=1$; and has an emission peak wavelength of 600 nm or more and a circularity of particle of 85% or more, the method includes: a gel body forming step of mixing and stirring an aqueous solution of an alkaline earth metal and an europium compound, and an aqueous solution of a water-soluble silicon compound to form a gel body; a drying step of drying the gel body obtained in the gel body forming step; a calcining step of calcining a dried matter obtained in the drying step in a temperature condition of from 600° C. to 1,400° C. in an air atmosphere; and a firing step of mixing a calcined powder obtained in the calcining step with a flux including at least barium chloride, followed by firing in a temperature condition of from 1,000° C. to 1,350° C. under a reducing atmosphere.

Herein, in the above described gel body forming step, it is preferable to perform the mixing and stirring at a solution temperature of from 20° C. to 100° C. in order to form the gel body.

In addition, it is preferable to remove the remaining flux from the fired product obtained in the above described firing step.

Advantageous Effects of Invention

According to the present invention, the phosphor has an emission peak wavelength of 600 nm or more, a high circularity of particle, an excellent dispersibility, and a higher luminance and a more excellent color rendering property than those of a conventional phosphor, so that the phosphor may be suitably used as a red phosphor for the production of a white LED.

DESCRIPTION OF EMBODIMENTS

Figure 1:
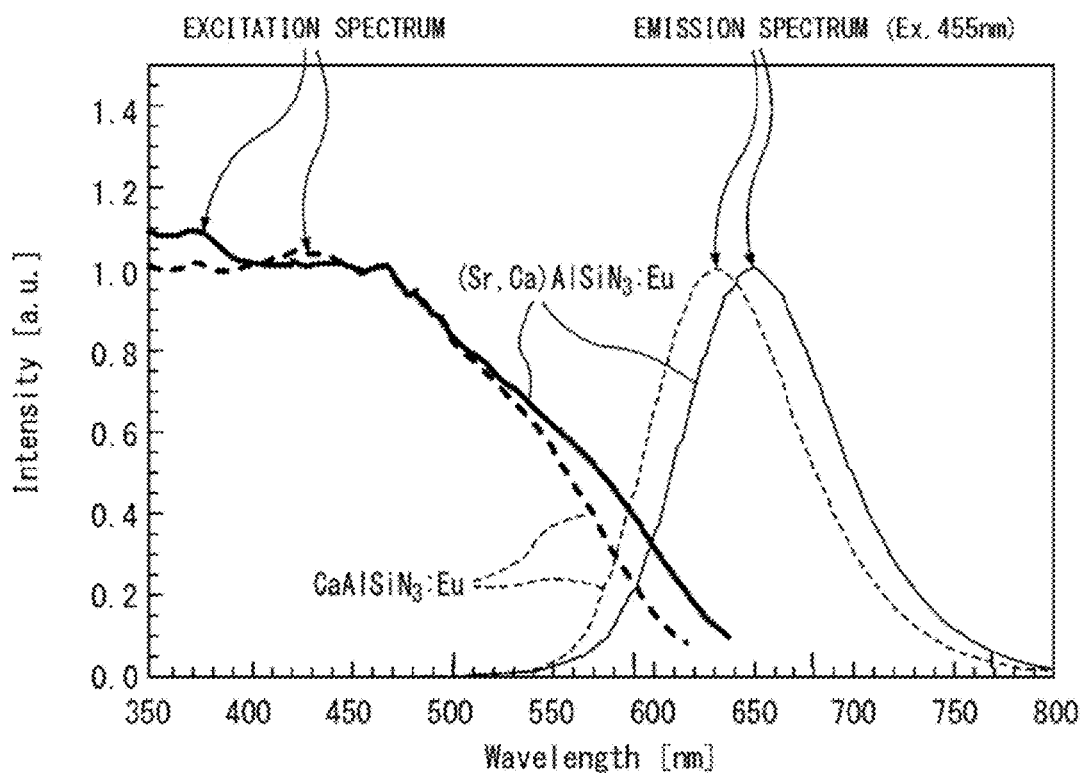
FIG. 1 illustrates excitation emission spectra of $CaAlSiN_3$:Eu and (Sr, Ca)$AlSiN_3$:Eu which have been conventionally used as a red phosphor.

Hereinafter, a detailed description is made of a specific embodiment (hereinafter, referred to as "the embodiment") of the alkaline earth metal silicate phosphor according to the present invention and a method for producing the alkaline earth metal silicate phosphor in the following order. Note that the present invention is not limited to the following embodiment, and various kinds of modifications are possible without deviating from the scope of the present invention.

1. An alkaline earth metal silicate phosphor
2. A method for producing the alkaline earth metal silicate phosphor
2-1. A step of forming a gel body
2-2. A step of performing drying
2-3. A step of performing calcining
2-4. A step of performing firing
3. Examples <1. An alkaline earth metal silicate phosphor>

The alkaline earth metal silicate phosphor according to the embodiment is a complex oxide to which europium (Eu) of rare earth elements is added as an activator, represented by composition formula (1) as described below, and having an emission peak wavelength of 600 nm or more and a circularity of particle of 85% or more.

  Composition formula (1)

(in the above described formula, a, b, c, d, e and f satisfying $0.4<a<0.6$, $0.4<b<0.6$, $0.01<c<0.05$, $0.01\leq d<0.4$, $0.7\leq e\leq 1.3$, $3.0\leq f\leq 5.0$ and $a+b+c+d=1$).

Specifically, in this alkaline earth metal silicate phosphor, the mixing ratio of strontium (Sr) and calcium (Ca) of alkaline earth metals is defined for the numbers (a) and (b) of atom so as to be $0.4<a<0.6$ and $0.4<b<0.6$, respectively. Because the ratio of these alkaline earth metals (a, b) is more than 0.4 but less than 0.6, the percentage of a crystal phase exhibiting a luminescence of 600 nm or more relatively increases, so that the phosphor has an emission peak wavelength of 600 nm or more.

In addition, in this alkaline earth metal silicate phosphor, the mixing ratio of barium (Ba) of alkaline earth metals is defined for the number (c) of atom so as to be $0.01<c<0.05$. In addition to the above described Sr and Ca, containing Ba of alkaline earth metals in the ratio of $0.01<c<0.05$ allows the peak intensity of the emission peak at 600 nm or more to be enhanced, so that the phosphor has an extremely high light emission luminance.

At least a part of Ba that is a component of this alkaline earth metal silicate phosphor is derived from a flux including barium chloride ($BaCl_2$) which is to be mixed at the time of firing in the phosphor production. Although a detailed description is made in the following description of a producing method, using a flux including at least $BaCl_2$ at the time of firing allows doping with Ba as a component, thereby enhancing the light emission luminance of the obtained phosphor.

In addition, the ratio of europium (Eu) added as an activator is defined for the number (d) of atom so as to be $0.01 \leq d < 0.4$. Containing Eu as an activator in the ratio of $0.01 \leq d < 0.4$ allows the phosphor to emit light at a wavelength of 600 nm or more without causing the concentration quenching.

In addition, in this alkaline earth metal silicate phosphor, the mixing ratio of silicon (Si) is defined for the number (e) of atom so as to be $0.7 \leq e \leq 1.3$. A mixing ratio of silicon of less than 0.7 is unpreferable, because SrO, CaO, $Sr_3SiO_5$ or $Ca_3SiO_5$, or the solid solution phase thereof is formed, so that the crystallizability worsens and the light emission luminance decreases. On the other hand, a mixing ratio of silicon of more than 1.3 is also unpreferable, because $SrSiO_3$ or $CaSiO_3$, or the solid solution phase thereof is formed, so that the crystallizability worsens and the light emission luminance decreases.

In addition, in the alkaline earth metal silicate phosphor, the mixing ratio of oxygen (O) is defined for the number (f) of atom so as to be $3.0 \leq f \leq 5.0$. When the mixing ratio of oxygen is less than 3.0, oxygen defect or substitution amount of O with Cl or the like is considered to be so excessive that the light emission property remarkably worsens. On the other hand, when the mixing ratio of oxygen is more than 5.0, unreduced $Eu_2O_3$ or a surface-adsorbed component is considered to be so excessive that the light emission property remarkably worsens similarly. Accordingly, in the alkaline earth metal silicate phosphor according to the embodiment, the ratio of oxygen (f) is defined so as to be $3.0 \leq f \leq 5.0$.

Note that it is considered that the coupling ratio of each of the above described constituent elements of Sr, Ca, Ba and Eu to oxygen is 1:1 (SrO, CaO, BaO, EuO), and that of Si to oxygen is 1:2 ($SiO_2$) in general. In this case, $e=0.7$ results in $f=3.4$, and $e=1.3$ results in $f=4.6$, so that the range of the amount of oxygen is unambiguously $3.4 \leq f \leq 4.6$. However, due to the presence of oxygen defect in the crystal or doping with Cl (substitution of the O site) of for example a flux component, the value may have $f<3.4$, $Eu_2O_3$ used as a europium compound for example may remain in a partly unreduced state, or due to the presence of a surface-adsorbed component or the like, the value may have $f>4.6$.

In accordance with the alkaline earth metal silicate phosphor having the above described composition, because of an emission peak wavelength of 600 nm or more, or a high circularity of particle, the light emission luminance is extremely higher than that of a conventional phosphor, so that the phosphor may be suitably used as a red phosphor. In addition, such a phosphor has a high absorbing ratio of an excitation light, so that the phosphor is excellent in light emission property.

Herein, the circularity is a ratio of the diameter equivalent to a circle area with respect to the diameter equivalent to a circle for the circumference length in a projection drawing of the particle, so the circularity of a monodispersed and completely spherical particle is 100%. The phosphor is more advantageous in emission intensity and dispersibility as the sphere property is higher. The above described alkaline earth metal silicate phosphor has a high circularity of particle of 85% or more. Also in this point, for example, in the production of a white LED, the phosphor may be kneaded into resin together with a yellow or green phosphor or the like so as to exhibit a high dispersibility, so that a white LED excellent in light emission property may be produced.

In addition, in this alkaline earth metal silicate phosphor, when an emission peak intensity excited at a wavelength by which the maximum excitation intensity is obtained is regarded as $I_{max}$, and an emission peak intensity at an excitation wavelength of 550 nm is regarded as $I_{ex550\ nm}$, a relationship of $(I_{ex550\ nm})/(I_{max})<0.25$ is satisfied.

Herein, in FIG. 1 are indicated excitation emission spectra of $CaAlSiN_3$:Eu (hereinafter, also referred to as "CASN") and (Sr, Ca)$AlSiN_3$:Eu (hereinafter, also referred to as "SCASN") which have been conventionally used as a red phosphor (refer to Non Patent Literature 1). Note that the excitation intensity corresponds to an emission intensity excited at each wavelength. As indicated in FIG. 1, the excitation spectra of both of the CASN and SCASN extend to a long wavelength side of a green to yellow region, and for example, the emission intensity ($I_{ex550\ nm}$) at 550 nm excitation is more than 50% of the emission intensity ($I_{max}$) at 400 nm excitation (the wavelength by which the maximum excitation intensity is obtained) (($I_{ex550\ nm})/(I_{max})>0.5$). This indicates that when a white LED is produced by mixing these red phosphors with a green to yellow phosphor for example, the red phosphors reabsorb light emitted from the green to yellow phosphor, thereby being excited to emit a red light. In other words, this indicates that a multistage excitation is easy to occur. When such a red phosphor is used for the preparation of a white LED, there easily arises unevenness in color, or deterioration of the luminous efficiency.

In contrast, in the alkaline earth metal silicate phosphor according to the embodiment, a relationship of $(I_{ex550\ nm})/(I_{max})<0.25$ is satisfied, as described above. Because the alkaline earth metal silicate phosphor has such an excitation spectrum shape, even when being mixed for use with a green or yellow phosphor, a multistage excitation is suppressed, for example deviation or unevenness in color of a white LED, decrease of the efficiency or color shift due to a multistage excitation may be suppressed. Accordingly, the phosphor exhibits an extremely high color purity and has an excellent color rendering property.

<2. A method for producing the alkaline earth metal silicate phosphor>

Next, a description is made of a method for producing the alkaline earth metal silicate phosphor composed of the above described characteristic composition.

A method for producing the alkaline earth metal silicate phosphor according to the embodiment includes a gel body forming step of mixing and stirring an aqueous solution of a raw material metal and an aqueous solution of a water-soluble silicon compound to form a gel body, a drying step of drying the gel body, a calcining step of calcining the dried matter, and a firing step of mixing the calcined powder with a flux and reduction firing the mixture. Hereinafter, a detailed description is made of each of the steps.

<2-1. A Step of Forming a Gel Body>

In a step of forming a gel body, salts of raw material metals and a compound of europium (Eu) as an activator weighted in a predetermined ratio are dissolved to form an aqueous solution. In the obtained aqueous solution, a predetermined amount of an aqueous solution of a water-soluble silicon compound is added, and the mixture is stirred, so that a gel body is obtained.

In this way, mixing raw material metals with a water-soluble silicon compound so as to form a gel body allows the raw material to be uniformly dispersed, so that a phosphor in which the components composed of the raw material metals are uniformly distributed may be obtained. Accordingly, the phosphor has a higher light emission luminance.

Specifically, first of all, raw material metal salts and an Eu compound added as an activator weighted in a predetermined ratio are mixed, so that an aqueous solution is prepared.

As a raw material metal salt, at least a calcium (Ca) salt, a strontium (Sr) salt and a europium (Eu) compound are used. As an example of the calcium salt and the strontium salt, a carbonate, acetate, nitrate, chloride salt or the like may be used, and among them, carbonate and acetate salts are preferably used. In addition, as a europium compound added as an activator, an oxide, acetate salt, nitrate salt or the like may be used, or simple europium may be used.

In addition, in the firing step as described below, using a flux including at least barium chloride ($BaCl_2$) may allow doping with barium (Ba) that is a component of the phosphor during the reduction firing, resulting in substitution of Sr or Ca, and additionally, in the gel body forming step, barium (Ba) in the form of for example a carbonate salt may be added together with the above mentioned calcium salt, strontium salt or the like.

Note that for the purpose of improving the characteristic, a very small amount of a rare earth element other than Eu may be added. In this case, various kinds of rare earth elements in the form of an oxide, chloride, nitrate salt, carbonate salt, acetate salt or the like may be used.

The above described raw material metal salt and europium compound are prepared as an aqueous solution (aqueous dispersion) in which these raw materials are dispersed, and which is produced by, first of all, adding at least the calcium salt and the strontium salt, along with the europium compound that is an activator in water, followed by stirring. Note that using an organic acid such as citric acid so as to dissolve the raw materials may produce the aqueous solution, but in this case, a thermolysis process or the like is required to remove the organic component within the obtained gel body.

On the other hand, in the gel body forming step, the aqueous dispersion in which the above described raw material metal salts are dispersed is prepared, along with a water-soluble silicon compound (WSS) is prepared. The water-soluble silicon compound may be prepared by, for example, adding tetraethoxysilane (TEOS) and a dihydric alcohol as raw materials individually so as to be 1:3 or more for the mole ratio, followed by mixing at 80° C. for 1 hour, and adding in the mixture a small amount (around 0.2% of the mixture) of acid as a catalyst, followed by stirring for 1 hour.

Using the water-soluble silicon compound prepared in this way allows easily mixing with the aqueous dispersion in which the raw material metal salts are dissolved. Moreover, forming a phosphor precursor (a dry matter of the gel body) through a wet synthesis with the use of such an aqueous solution allows a phosphor precursor in which the raw materials are uniformly dispersed to be obtained, in particular Eu that is an activator to be uniformly added, so that a phosphor having a high luminance may be effectively prepared.

As the dihydric alcohol, for example propylene glycol may be used, and as the acid used as a catalyst, hydrochloric acid or lactic acid may be used.

In addition, as to the water-soluble silicon compound, for example adding TEOS and propylene glycol so as to be 1:3 or more for the mole ratio results in the water-soluble one. When the mole ratio is less than 1:4, it is easy to gelate. Accordingly, in the case of preservation for a long time, TEOS and propylene glycol are preferably mixed so as to be 1:4 or more for the mole ratio.

In the gel body forming step, the separately prepared aqueous dispersion in which the raw material metals are dispersed and water-soluble silicon compound, as described above, are mixed so as to be in a desired composition ratio, so that the gel body is prepared.

In the embodiment, the prepared alkaline earth metal silicate phosphor is represented by composition formula (1): $(Sr_aCa_bBa_cEu_d)_2Si_eO_f$, in formula (1), a, b, c, d, e and f satisfying $0.4<a<0.6$, $0.4<b<0.6$, $0.01<c<0.05$, $0.01 \leq d<0.4$, $0.7 \leq e \leq 1.3$, $3.0 \leq f \leq 5.0$ and $a+b+c+d=1$. Because the atom ratio in the supplied raw materials and the atomic composition ratio of the obtained phosphor substantially match with each other, it is preferable to weight and mix the aqueous dispersion composed of the raw material metal salts and the Eu compound weighted, and the water-soluble silicon compound separately, so as to be in a desired raw material blending ratio.

Note that Ba composes the alkaline earth metal silicate phosphor, in which a part of Sr or Ca has been substituted and doped with Ba included in a flux added in the firing step as described below. Accordingly, in the firing step as described below, it is preferable to add and mix a flux such that Ba derived from the flux is contained in a desired composition ratio. In addition, because the substitution with Ba derived from the flux slightly decreases the containing percentage of Sr or Ca, it is preferable that a first raw material blending ratio be set and then the raw materials be weighted and mixed so as to result in the phosphor represented by the desired composition formula.

In the formation of the gel body, in the aqueous solution in which the alkaline earth metals are dissolved, the water-soluble silicon compound is added and mixed, followed by stirring to gelate. The time required for the gelation varies depending on the type of the alkaline earth metal elements or the water content in the aqueous solution. In addition, in order to more effectively promote the gelation, in the water-soluble silicon compound to be used, propylene glycol that is dihydric alcohol may be add in an amount corresponding to 6 times to 12 times the total number of moles of the metallic elements.

In addition, as to the gelation temperature, the solution temperature is preferably adjusted to 20° C. to 100° C., more preferably adjusted to 20° C. to 80° C. When the temperature is lower than 20° C., the gelation time gets longer, but when the temperature is higher than 100° C., water boils, which makes the uniform gelation difficult. Accordingly, mixing and stirring the solution at a temperature of from 20° C. to 100° C. allow the gel body to be effectively formed in which the raw materials are uniformly dispersed.

<2-2. A Step of Performing Drying>

In a drying step, the gel body obtained through the gel body forming step is dried by, for example placing the gel body in a hot air drier or the like.

In the gel body obtained through the gel body forming step, as solvent components, in addition to water, a part of dihydric alcohol such as ethanol or propylene glycol derived from the water-soluble silicon compound (WSS) is included. Accordingly, in this drying step, the obtained gel body is dried, so that the solvent component included within the gel body is removed. Accordingly, a phosphor precursor that is a dry matter of the gel body is formed.

The drying temperature in the drying step is not limited in particular, but it is preferable to perform drying at around 80° C. to 100° C. In addition, the drying time is also not limited in particular, but may be set to around 5 hours to 10 hours.

<2-3. A Step of Performing Calcining>

In a calcining step, the phosphor precursor that is a dry matter of the gel body obtained through the drying step is calcined in a predetermined calcining condition, so that a calcined powder is obtained. In this calcining step, dihydric alcohol or the like derived from the WSS remaining after the above described drying step is decomposed and removed, along with the carbonate salt in the dry matter is decomposed, so that a host crystal is grown.

As the calcining process condition, the temperature condition is preferably adjusted to 600° C. to 1,400° C. in an air atmosphere. When the calcining temperature is lower than 600° C., there may arise insufficient decomposition of the dihydric alcohol such as propylene glycol or the carbonate salt, and insufficient growth of the host crystal. On the other hand, a temperature of higher than 1,400° C. is unpreferable, because there arises complete sintering or byproduct formation.

<2-4. A Step of Performing Firing>

In a firing step, the calcined powder obtained in the calcining step is fired to be reduced in a predetermined firing condition under a reducing atmosphere. In this firing step, the host crystal is grown, along with the valence of Eu that is an activator is changed from 3 to 2 so as to allow doping.

Moreover, in this firing step, it becomes important to mix and fire the calcined powder with a flux. In particular, this firing step is performing reduction firing in the presence of a flux including at least barium chloride ($BaCl_2$).

Mixing the calcined powder with a flux and performing reduction firing allow the crystal growth to be promoted by the presence of the flux. In addition, phosphor particles obtained by performing reduction firing in the presence of the flux in this way are in the order of several 10 μm, are nearly monodispersed, and have a high circularity of particle. Accordingly, for example in the production of a white LED, when the phosphor particles are kneaded into resin together with a green or yellow phosphor, they may be dispersed so well that the kneading property is improved. Note that the particle diameter of the phosphor particles may be changed within a range of from several μm to 50 μm in accordance with the type or adding amount of the flux, or the firing temperature.

Moreover, in particular using as a flux the one including at least $BaCl_2$ allows a phosphor having a higher luminance than that of a conventional phosphor to be obtained. In this regard, the mechanism is not sure, but it is considered that using a flux including $BaCl_2$ allows doping with Ba included in the flux as a component of the phosphor, thereby improving the light emission luminance.

The flux to be mixed with the calcined powder is defined as a flux including at least barium chloride ($BaCl_2$) as described above. In other words, a flux including $BaCl_2$ alone, or along with $BaCl_2$ one or more compounds such as a chloride (such as $NH_4Cl$, $LiCl$, $NaCl$, $KCl$, $CsCl$, $CaCl_2$, $SrCl_2$, $YCl_3$, $ZnCl_2$, $MgCl_2$ or $RbCl$) or a hydrate salt thereof, a fluoride (such as $LiF$, $NaF$, $KF$, $CsF$, $CaF_2$, $BaF_2$, $SrF_2$, $AlF_3$, $MgF_2$ or $YF_3$), or a phosphate salt (such as $K_3PO_4$, $K_2HPO_4$, $KH_2PO_4$, $Na_3PO_4$, $Na_2HPO_4$, $NaH_2PO_4$, $Li_3PO_4$, $Li_2HPO_4$, $LiH_2PO_4$, $(NH_4)_3PO_4$, $(NH_4)_2HPO_4$ or $(NH_4)H_2PO_4$) may be used. Among them, a flux including $SrCl_2$ or $CaCl_2$ along with $BaCl_2$ is preferably used.

In the reduction firing, as to the reducing atmosphere, a mixed gas of a hydrogen gas and an inert gas such as a nitrogen gas or argon gas, or the like is preferably used.

In addition, as to the temperature condition for the reduction firing, a temperature of 1,000° C. to 1,350° C. is preferable, or a temperature of 1,100° C. to 1,300° C. is more preferable. When the reduction firing temperature is lower than 1,000° C., the reduction firing process applied to the calcined powder is not effectively progressed. On the other hand, a reduction firing temperature of higher than 1,350° C. is unpreferable, because the particle diameter becomes so enlarged that the use as a phosphor for an LED or the like is difficult, the high temperature phase is formed as an impurity phase, or a localized meltdown is caused.

In addition, the reduction firing processing time is preferably from 0.5 hour to 12 hours, or more preferably from 1 hour to 6 hours. Note that the reduction firing process may be repeatedly performed over a plurality of times.

Crushing the fired product obtained by reduction firing the calcined powder as described above allows phosphor particles having a desired composition to be obtained. At this time, on the surface of the fired product (the phosphor particles), the flux mixed in the firing step may remain. The remaining flux on the surface of the phosphor particles is unpreferable, because deterioration of the fluorescence intensity may be caused. Accordingly, the fired product obtained as described above is preferably washed with water or the like before or after the crushing, so as to remove the flux remaining on the particle surface. After the washing process is performed in this way, substitution with ethanol or the like and drying are performed, so that a phosphor is obtained. Furthermore, for the purpose of recovering the surface damage caused by the cracking or washing in order to further improve the light emission luminance, annealing may be performed in an appropriate atmosphere or at an appropriate temperature.

Note that, in general, an alkaline earth metal silicate phosphor has a problem associated with the resistance against humidity. Accordingly, in order to improve the surface stability of the phosphor, it is preferable to perform a surface processing for coating the surface of the obtained phosphor particles with a different substance. An example of the material for the surface processing may include an organic compound, an inorganic compound, a glass material and the like. Among them, silicon oxide that is an oxide is preferably used in performing the surface processing.

In accordance with the producing method as described above in detail, the alkaline earth metal silicate phosphor represented by the composition formula of $(Sr_aCa_bBa_cEu_d)_2Si_eO_f$ may be produced, in the composition formula, a, b, c, d, e and f satisfying $0.4<a<0.6$, $0.4<b<0.6$, $0.01<c<0.05$, $0.01 \leq d<0.4$, $0.7 \leq e \leq 1.3$, $3.0 \leq f \leq 5.0$ and $a+b+c+d=1$.

Moreover, the alkaline earth metal silicate phosphor produced in this way has an emission peak wavelength of 600 nm or more, and furthermore may emit light having a higher luminance than that of a conventional phosphor. Accordingly, the phosphor may be suitably used as a red phosphor. In addition, such a phosphor has a high absorbing ratio of an excitation light, so that the phosphor is excellent in light emission property.

In addition, in the alkaline earth metal silicate phosphor produced in this way, from the excitation spectrum shape, in the case of being mixed for use with a green or yellow phosphor or the like, a multistage excitation hardly occurs, deviation or unevenness in color of a white LED, decrease of the efficiency or color shift due to a multistage excitation may be suppressed. Accordingly, the phosphor may be suitably used as a red phosphor for a white LED.

Furthermore, as can be seen from the producing method as described above, the production may be inexpensively and easily achieved without subjecting a complicated producing step, and without using a special producing facility, like a conventional nitride phosphor or sulfide phosphor.

Still further, as described above, growing the grain with the use of a flux allows nearly monodispersed particles having a high circularity to be obtained. Specifically, particles having a circularity of 85% or more may be obtained. Accordingly, for example, in the production of a white LED, when the particles are kneaded into resin together with a yellow or green phosphor or the like, they exhibit an excellent dispersibility.

In addition, the alkaline earth metal silicate phosphor produced in this way is suitable for a white LED from the points of view of the specific gravity and shape. In other words, a common green or yellow phosphor that is used with a red phosphor in the production of a white LED, (Ba, Sr)$_2$SiO$_4$:Eu, (Y, Gd)Al$_5$O$_{12}$:Ce or the like, has a specific gravity of around 4 to 5 g/cm$^3$, a shape such that the order is approximately from several μm to 30 μm and the flattening is small, and is nearly monodispersed, although it depends on the composition. In contrast, CASN that is a conventional red phosphor has a specific gravity of around 3.3 g/cm$^3$, is an aggregate of particles having a particle diameter of several μm or less, and has a large difference of the specific gravity or the shape with respect to that of a green or yellow phosphor to be combined, although it depends on the composition.

On the other hand, the specific gravity of the alkaline earth metal silicate phosphor according to the embodiment is assumed to be around 4 g/cm$^3$ from the crystal data of SrCaSiO$_4$, so that flux firing may result in nearly monodispersed particles growing up to several μm to several 10 μm and having a small flattening. Accordingly, the difference of the specific gravity or the shape with respect to that of a common green or yellow phosphor to be combined becomes relatively small. The small difference of the specific gravity or the shape is very effective in the uniform kneading with a green or yellow phosphor.

In this way, with the use of the alkaline earth metal silicate phosphor according to the embodiment, mixing with a phosphor emitting a green to yellow light to form a fluorescent layer and combining the fluorescent layer with a blue LED allow a red component to be more effectively supplemented, so that a white LED more excellent in color rendering property may be inexpensively obtained.

Herein, in the preparation of a white LED, the structure is not limited in particular, but, for example, such a structure that the fluorescent layer is formed directly above a blue LED and is sealed with the blue LED, or a so-called remote phosphor in which a phosphor sheet formed of resin, rubber or the like is placed apart from a blue LED may be used to achieve a white LED device.

Note that the green to yellow phosphor includes various kinds of substances such as SrAl$_2$O$_4$:Eu, Ca$_3$Sc$_2$Si$_3$O$_{12}$:Ce, CaSc$_2$O$_4$:Ce, (Ba, Sr)$_2$SiO$_4$:Eu, Ba$_3$Si$_6$O$_{12}$N$_2$:Eu, β-sialon, Y$_3$Al$_5$O$_{12}$:Ce, Y$_3$(Al, Ga)$_5$O$_{12}$Ce, (Y, Gd)$_3$Al$_5$O$_{12}$:Eu, Lu$_3$Al$_5$O$_{12}$, or Ca-α sialon. Among them, in particular, any of (Ba, Sr)$_2$SiO$_4$:Eu, Y$_3$Al$_5$O$_{12}$:Ce, Y$_3$(Al, Ga)$_5$O$_{12}$:Ce, (Y, Gd)$_3$Al$_5$O$_{12}$:Eu, Lu$_3$Al$_5$O$_{12}$ and Ca-α sialon is preferable.

EXAMPLES

<3. Example>

Hereinafter, a more detailed description is made with reference to Examples in which the present invention is applied. Note that the present invention is not limited to the following Examples.

In the Examples, a phosphor prepared in each of the Examples and Comparative Examples was subjected to measurement of an emission spectrum by an excitation at 455 nm, and further subjected to measurement of an excitation spectrum with respect to the emission peak wavelength, with the use of a fluorescence spectrophotometer FP-6500 (made by JASCO Corporation). The emission intensity was evaluated as a relative luminance that was standardized by regarding the highest luminance of a conventional yellow phosphor YAG:Ce (made by PhosphorTech Corporation, QMK58/F-U1) as 1.

In addition, as to the luminous efficiency of the phosphor, the absorbing ratio by the phosphor of an excitation light (the absorbing efficiency of an excitation light) at 455 nm, internal quantum efficiency and external quantum efficiency were measured with the use of an integrating sphere. Note that the internal quantum efficiency indicates a converting efficiency of an absorbed excitation light into fluorescence. On the other hand, the external quantum efficiency indicates a converting efficiency of an excitation light with which the phosphor has been irradiated into fluorescence. The external quantum efficiency is calculated by multiplying the absorbing ratio by the internal quantum efficiency.

Furthermore, with the use of a vacuum dispersion particle image analyzer for particle size distribution (VD-400nano) made by JASCO International Co., Ltd., the circularity of obtained phosphor particles was evaluated.

Example 1

<Preparation of the Phosphor>

In Example 1, as described below, in accordance with a solution method with the use of a water-soluble silicon compound (WSS), a precursor was obtained, and the precursor was fired, so that the phosphor was prepared. Note that the used WSS was prepared by weighting tetraethoxysilane (TEOS) and propylene glycol so as to be 1:4 for the mole ratio, followed by mixing at 80° C. for 1 hour, and adding to the obtained mixture a very small amount of lactic acid as an acid, followed by stirring for additional 1 hour. Moreover, to this was added pure water, so that an aqueous solution including 2 mol/L WSS was obtained.

(A Step of Forming a Gel Body)

As raw materials, CaCO$_3$ (made by Wako Pure Chemical Industries, Ltd.), SrCO$_3$ (made by Kanto Chemical Co., Inc.) and Eu$_2$O$_3$ (3N, made by Kojundo Chemical Lab. Co., Ltd.) were weighted so as to have a composition formula (Ca$_{0.925}$Sr$_{0.925}$Eu$_{0.15}$SiO$_4$), and added in 3.5 times weight of water with respect to the total weight of the weighted raw materials, followed by stirring at a room temperature for 30 minutes, so that an aqueous dispersion was prepared. Subsequently, a predetermined amount of the aqueous solution having a concentration of 2 mol/L WSS was weighted. Next, in the aqueous dispersion of the raw materials, the WSS aqueous solution was added, followed by stirring at a room temperature for 10 minutes. After the whole solution was confirmed to be in a uniform slurry state, warming was started by a hot magnetic stirrer. The heating temperature was set such that the mixture temperature was at 50° C. Approximately 20 minutes from the start of the warming, the whole mixture gelated, so that a uniform gel body was obtained.

(A Step of Performing Drying)

Next, the obtained gel body was dried for 6 hours in a hot air drier set to be 100° C. The dried gel body was taken out and then lightly crushed in a mortar, so that a phosphor precursor that was the dry matter was obtained.

(A Step of Performing Calcining)

Next, the obtained phosphor precursor that was the dry matter was placed in a container made of alumina, and then subjected to a heat treatment in a temperature condition of 1,000° C. in an air atmosphere for 3 hours, so that the phosphor precursor was calcined.

(A Step of Performing Firing)

Next, to an obtained calcined powder, 20% by weight of $BaCl_2$ as a flux with respect to the weight of the calcined powder were added, followed by mixing. Moreover, the mixed powder was placed in a boat made of carbon, and then reduction fired in an atmosphere of Ar-4% $H_2$ in a temperature condition of 1,200° C. for 4 hours with the use of an electric tubular furnace (made by Yamada Denki Co., Ltd., TSR-630), so that a fired product was obtained.

(A Step of Removing a Remaining Flux)

Note that the obtained fired product was crushed in an agate mortar, the surface on which the flux component remained was washed with the use of pure water, and then substitution with ethanol and warm air-drying were performed, so that a phosphor was obtained.

The finally obtained phosphor was analyzed and found to have a composition of $Ca_{0.918}Sr_{0.867}Ba_{0.074}Eu_{0.141}SiO_4$. From the composition formula, it is supposed that a part of Ca and Sr was substituted with Ba derived from $BaCl_2$ added as a flux. In addition, the phosphor had a particle shape such that the particles from 10 to 30 μm were monodispersed, and had a small flattening.

<Evaluation of the Emission Excitation Spectrum>

Figure 2:
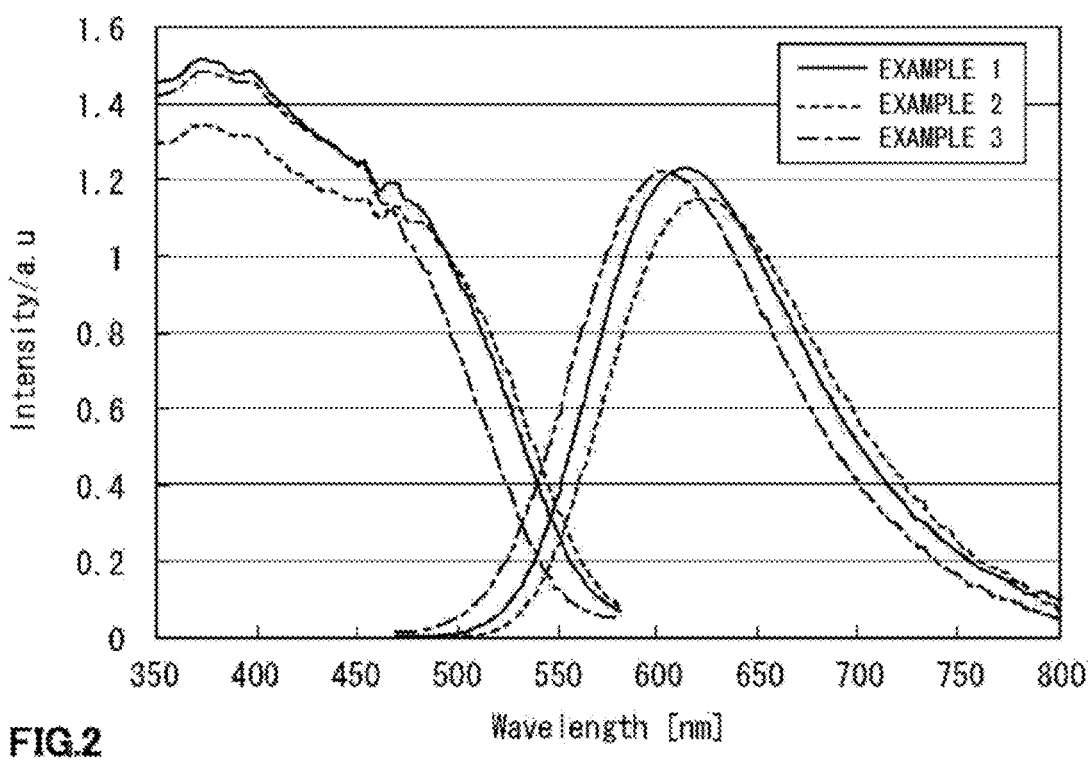
FIG. 2 illustrates emission spectra of the phosphors prepared in Examples 1 to 3.

FIG. 2 indicates an emission excitation spectrum of the obtained phosphor. In addition, in the following Table 1, the composition, emission peak wavelength, relative luminance with respect to YAG:Ce, absorbing ratio, external quantum efficiency, internal quantum efficiency, and ratio of the emission peak intensity excited at a wavelength by which the maximum excitation intensity is obtained ($I_{max}$) and the emission peak intensity at an excitation wavelength of 550 nm ($I_{ex550\ nm}$) (($I_{ex550\ nm}$)/($I_{max}$)) of the phosphor are indicated.

As indicated in FIG. 2 and Table 1, because the emission peak wavelength of the obtained phosphor is 614 nm, and moreover the light emission luminance is so very high as to be 1.22 in terms of the ratio with respect to YAG:Ce, it has been found that the phosphor is favorably usable as a red phosphor. In addition, in view of the excitation spectrum, as compared to the excitation spectrum of a conventional CASN or SCASN (see FIG. 1), because the excitation intensity at around 550 nm is lower, and the ratio represented by ($I_{ex550\ nm}$)/($I_{max}$) is so very small as to be 0.17, it may be confirmed that the phosphor has such an excitation spectrum shape that the influence by the multistage excitation hardly appears.

<Evaluation of the Particle Shape>

Figure 3:
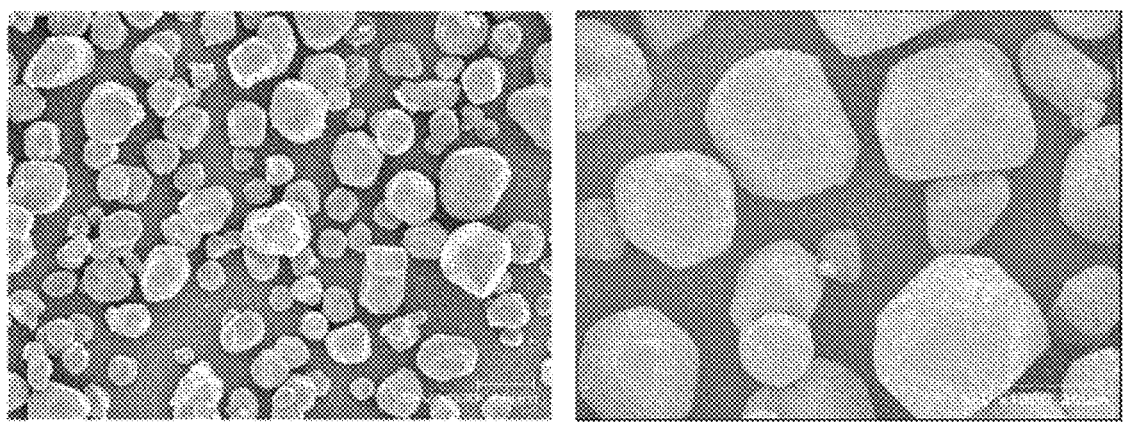
FIG. 3 is electron microscopy (SEM) images of the phosphor particles prepared in Example 1.

In addition, from the result of the particle size distribution measurement of the obtained phosphor, the circularity was 85.9%. In addition, FIG. 3 shows electron microscopy (SEM) images of the phosphor powder. Also from the SEM images, it is found that the obtained particles are nearly monodispersed and spherical having a diameter of around 20 μm.

Note that, as described above, it has been found that the phosphor may be inexpensively and easily produced without subjecting a complicated producing step, and without requiring a special producing facility, like a conventional nitride phosphor or the like.

Example 2

<Preparation of the Phosphor>

Except that the composition for preparation is a composition ($Ca_{0.85}Sr_{0.85}Eu_{0.30}SiO_4$), the phosphor was prepared in the same way as described in Example 1. The finally obtained phosphor was analyzed and found to have a composition of $Ca_{0.830}Sr_{0.816}Ba_{0.077}Eu_{0.277}Si_{0.968}O_{3.936}$. From the composition formula, it is supposed that a part of Ca and Sr was substituted with Ba derived from $BaCl_2$ added as a flux.

<Evaluation of the Emission Excitation Spectrum>

FIG. 2 indicates an emission excitation spectrum of the obtained phosphor. In addition, in the following Table 1, the same evaluation results as those of Example 1 are indicated.

As indicated in FIG. 2 and Table 1, because the emission peak wavelength of the obtained phosphor is 623 nm, and moreover the light emission luminance is so very high as to be 1.16 in terms of the ratio with respect to YAG:Ce, it has been found that the phosphor is favorably usable as a red phosphor. In addition, in view of the excitation spectrum, as compared to the excitation spectrum of a conventional CASN or SCASN (see FIG. 1), because the excitation intensity at around 550 nm is lower, and the ratio represented by ($I_{ex550\ nm}$)/($I_{max}$) is so very small as to be 0.22, it may be confirmed that the phosphor has such an excitation spectrum shape that the influence by the multistage excitation hardly appears.

<Evaluation of the Particle Shape>

In addition, from the result of the particle size distribution measurement of the obtained phosphor, the circularity was 88.9%. In addition, as the result of observation by an electron microscope, similarly to FIG. 3, it has been found that the obtained particles are nearly monodispersed and spherical having a diameter of around 20 μm.

Example 3

<Preparation of the Phosphor>

Except that the composition for preparation is a composition ($Ca_{0.975}Sr_{0.975}Eu_{0.05}SiO_4$), the phosphor was prepared in the same way as described in Example 1. The finally obtained phosphor was analyzed and found to have a composition of $Ca_{0.967}Sr_{0.913}Ba_{0.07}Eu_{0.05}SiO_4$. From the composition formula, it is supposed that a part of Ca and Sr was substituted with Ba derived from $BaCl_2$ added as a flux.

<Evaluation of the Emission Excitation Spectrum>

FIG. 2 indicates an emission excitation spectrum of the obtained phosphor. In addition, in the following Table 1, the same evaluation results as those of Example 1 are indicated.

As indicated in FIG. 2 and Table 1, because the emission peak wavelength of the obtained phosphor is 604 nm, and moreover the light emission luminance is so very high as to be 1.21 in terms of the ratio with respect to YAG:Ce, it has been found that the phosphor is favorably usable as a red phosphor. In addition, in view of the excitation spectrum, as compared to the excitation spectrum of a conventional CASN or SCASN (see FIG. 1), because the excitation intensity at around 550 nm is lower, and the ratio represented by $(I_{ex550\ nm})/(I_{max})$ is so very small as to be 0.10, it may be confirmed that the phosphor has such an excitation spectrum shape that the influence by the multistage excitation hardly appears.

<Evaluation of the Particle Shape>

In addition, from the result of the particle size distribution measurement of the obtained phosphor, the circularity was 87.8%. In addition, as the result of observation by an electron microscope, similarly to FIG. 3, it has been found that the obtained particles are nearly monodispersed and spherical having a diameter of around 20 μm.

Comparative Example 1

<Preparation of the Phosphor>

Except that, in the firing step, $SrCl_2$ was used as a flux and 20% by weight thereof with respect to the weight of the calcined powder were added, followed by mixing, the phosphor was obtained by performing the same operation as described in Example 1. The composition of the obtained phosphor was a composition of the original raw material blending ratio $(Ca_{0.925}Sr_{0.925}Eu_{0.15}SiO_4)$.

<Evaluation of the Emission Excitation Spectrum>

Figure 4:
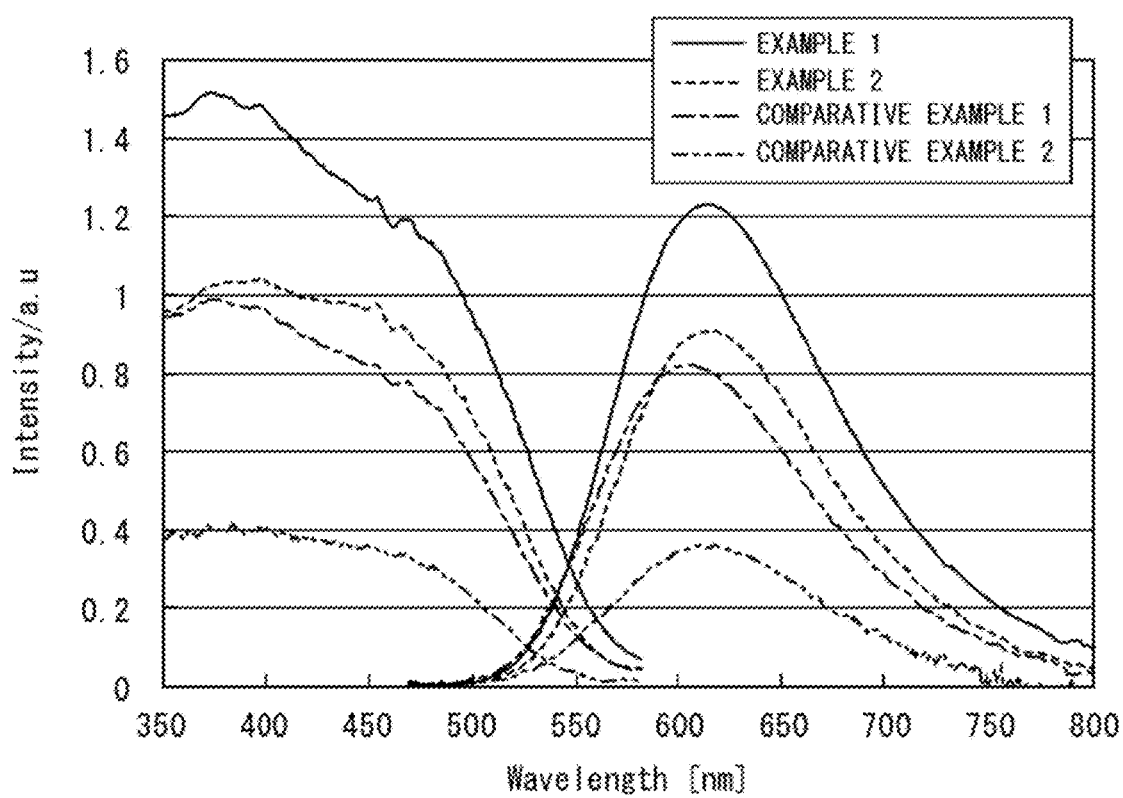
FIG. 4 illustrates emission spectra of the phosphors prepared in Comparative Examples 1, 2 and 4.

FIG. 4 indicates an emission excitation spectrum of the obtained phosphor, as compared to Example 1. In addition, in the following Table 1, the same evaluation results as those of the Examples are indicated.

As indicated in FIG. 4 and Table 1, because the emission peak wavelength is 615 nm in a longer wavelength side than 600 nm, it has been found that the phosphor is usable as a red phosphor. However, the emission intensity was so very low as to be 0.89 in terms of the ratio with respect to conventional YAG:Ce.

<Evaluation of the Luminous Efficiency of the Phosphor>

In addition, although the absorbing ratio by the obtained phosphor was so high as to be 86.8%, the internal quantum efficiency and the external quantum efficiency were lower than those of the Examples.

<Evaluation of the Particle Shape>

In addition, from the result of the particle size distribution measurement of the obtained phosphor, the circularity was 89.3%. In addition, the SEM image of the phosphor powder has approximately the same shape as that of Example 1 shown in FIG. 3, and thus it has been confirmed that the obtained particles are nearly monodispersed and spherical having a diameter of around 20 μm.

Comparative Example 2

<Preparation of the Phosphor>

Except that the composition for preparation was a composition $(Ca_{0.875}Sr_{0.875}Ba_{0.10}Eu_{0.15}SiO_4)$, the phosphor was obtained by performing the same operation as described in Example 1. The finally obtained phosphor was analyzed and found to have a composition of $Ca_{0.878}Sr_{0.827}Ba_{0.155}Eu_{0.14}SiO_4$. From the composition formula, it is supposed that a part of Ca and Sr was substituted with Ba derived from $BaCl_2$ added as a flux.

<Evaluation of the Emission Excitation Spectrum>

FIG. 4 indicates an emission excitation spectrum of the obtained phosphor, as compared to Example 1. In addition, in the following Table 1, the same evaluation results as those of Example 1 are indicated.

As indicated in FIG. 4 and Table 1, because the emission peak wavelength is 607 nm in a longer wavelength side than 600 nm, it has been found that the phosphor is usable as a red phosphor. However, the emission intensity was so very low as to be 0.82 in terms of the ratio with respect to conventional YAG:Ce.

<Evaluation of the Luminous Efficiency of the Phosphor>

In addition, the absorbing ratio by the obtained phosphor was so slightly lower as to be 82.7% than those by the Examples, and the internal quantum efficiency and the external quantum efficiency were also very lower than those of the Examples.

<Evaluation of the Particle Shape>

In addition, from the result of the particle size distribution measurement of the obtained phosphor, the circularity was 89.3%. In addition, the SEM image of the phosphor powder has approximately the same shape as that of Example 1 shown in FIG. 3, and thus it has been confirmed that the obtained particles are nearly monodispersed and spherical having a diameter of around 20 μm.

Comparative Example 3

<Preparation of the Phosphor>

Except that, in the firing step, without the use of a flux, the reduction firing were performed in a temperature condition of from 1,400° C. for 2 hours, the phosphor was obtained by performing the same operation as described in Example 1. Note that because a flux was not used, the remaining flux-removal process was not performed. The composition of the obtained phosphor was a composition of the original raw material blending ratio $(Ca_{0.925}Sr_{0.925}Eu_{0.15}SiO_4)$.

<Evaluation of the Emission Excitation Spectrum>

In the following Table 1, the same evaluation results as those of the Examples are indicated.

As indicated in Table 1, because the emission peak wavelength is 615 nm in a longer wavelength side than 600 nm, it has been found that the phosphor is usable as a red phosphor. However, the emission intensity was so extremely low as to be 0.40 in terms of the ratio with respect to conventional YAG:Ce.

<Evaluation of the Luminous Efficiency of the Phosphor>

In addition, the absorbing ratio by the obtained phosphor was so lower as to be 69.3% than those by the Examples, and the internal quantum efficiency and the external quantum efficiency were also very lower than those of the Examples, indicating that the effectiveness was inferior.

<Evaluation of the Particle Shape>

In addition, it was clear that the obtained powder was composed of aggregated particles of the order of from 2 to 3 μm having an extremely low circularity. This is because a flux as a crystal grower was not used.

Comparative Example 4

<Preparation of the Phosphor>

In accordance with a method disclosed in Patent Literature 4 (JP 2008-24791 A), the phosphor having a composition represented by $(Ca_{0.925}Sr_{0.925}Eu_{0.15}SiO_4)$ was prepared.

First of all, as raw materials, $CaCO_3$ (made by Wako Pure Chemical Industries, Ltd.), $SrCO_3$ (made by Kanto Chemical Co., Inc.), $Eu_2O_3$ (3N, made by Kojundo Chemical Lab. Co., Ltd.) and $SiO_2$ (Admafine SO-E1, made by Admatechs Company Limited) were used and weighted so as to have a composition formula $(Ca_{0.925}Sr_{0.925}Eu_{0.15}SiO_4)$. Furthermore, 3% by weight of $NH_4Cl$ were added thereto with respect to the base powder, followed by uniformly mixing by a ball mill.

The mixed raw materials obtained were contained in a container, and first of all, reduction fired under a reducing atmosphere of $N_2$—$H_2$ at 1,200° C. for 4 hours, so that a primary fired product was obtained. This product was pulverized, and the pulverized one was contained again in a crucible, which was subsequently placed in a furnace. The inside of the furnace was then replaced with a vacuum. Next, secondary firing was performed under an atmosphere of $N_2$-5% $H_2$ at 1,200° C. for 4 hours, so that a secondary fired product was obtained. The obtained secondary fired product was pulverized in water, followed by sieving and dehydrating by a suction filtration. Finally, drying was performed in a dryer at 150° C., followed by additional sieving, so that a phosphor was obtained. The composition of the obtained phosphor was a composition of the original raw material blending ratio $(Ca_{0.925}Sr_{0.925}Eu_{0.15}SiO_4)$.

<Evaluation of the Emission Excitation Spectrum>

FIG. 4 indicates an emission excitation spectrum of the obtained phosphor, as compared to Example 1. In addition, in the following Table 1, the same evaluation results as those of the Examples are indicated.

As indicated in FIG. 4 and Table 1, because the emission peak wavelength is 617 nm in a longer wavelength side than 600 nm, it has been found that the phosphor is usable as a red phosphor. However, the emission intensity was so extremely low as to be 0.36 in terms of the ratio with respect to conventional YAG:Ce.

<Evaluation of the Luminous Efficiency of the Phosphor>

In addition, the absorbing ratio by the obtained phosphor was so lower as to be 72.5% than those by the Examples, and the internal quantum efficiency and the external quantum efficiency were also very lower than those of the Examples, indicating that the effectiveness was inferior.

<Evaluation of the Particle Shape>

Figure 5:
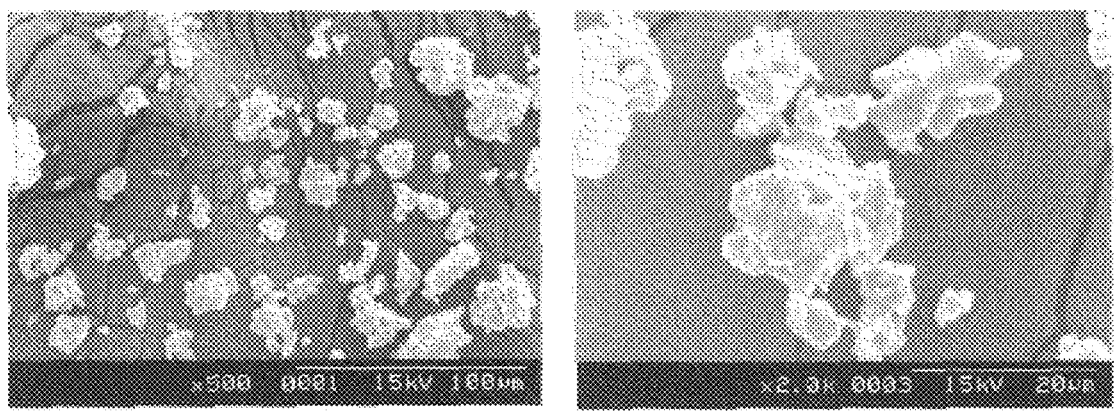
FIG. 5 is electron microscopy (SEM) images of the phosphor particles prepared in Comparative Example 4.

In addition, FIG. 5 shows electron microscopy (SEM) images of the phosphor particles. The obtained powder was composed of aggregated particles of the order of from 2 to 3 μm, as shown in FIG. 5. In addition, from the SEM images, it is found that the particles have an extremely low circularity.

TABLE 1

| | COMPOSITION | EMISSION PEAK WAVELENGTH (nm) | RELATIVE LUMINANCE | ABSORBING RATIO (%) | INTERNAL QUANTUM EFFICIENCY (%) | EXTERNAL QUANTUM EFFICIENCY (%) | Iex550/ Imax | CIRCULARITY |
|---|---|---|---|---|---|---|---|---|
| EXAMPLE 1 | $Ca_{0.918}Sr_{0.867}Ba_{0.074}Eu_{0.141}SiO_4$ | 614 | 1.22 | 85.0 | 65.5 | 55.7 | 0.17 | 85.9 |
| EXAMPLE 2 | $Ca_{0.830}Sr_{0.816}Ba_{0.077}Eu_{0.277}Si_{0.968}O_{3.936}$ | 623 | 1.16 | 89.6 | 58.5 | 52.4 | 0.22 | 88.9 |
| EXAMPLE 3 | $Ca_{0.967}Sr_{0.913}Ba_{0.07}Eu_{0.05}SiO_4$ | 604 | 1.21 | 84.1 | 65.2 | 54.9 | 0.10 | 87.8 |
| COMPARATIVE EXAMPLE 1 | $Ca_{0.925}Sr_{0.925}Eu_{0.15}SiO_4$ | 615 | 0.89 | 86.8 | 46.3 | 40.2 | 0.18 | 89.3 |
| COMPARATIVE EXAMPLE 2 | $Ca_{0.878}Sr_{0.827}Ba_{0.155}Eu_{0.14}SiO_4$ | 607 | 0.82 | 82.7 | 44.3 | 36.3 | 0.10 | 89.3 |
| COMPARATIVE EXAMPLE 3 | $Ca_{0.925}Sr_{0.925}Eu_{0.15}SiO_4$ | 615 | 0.40 | 69.3 | 24.4 | 16.9 | 0.10 | AGGREGATED PARTICLES |
| COMPARATIVE EXAMPLE 4 | $Ca_{0.925}Sr_{0.925}Eu_{0.15}SiO_4$ | 617 | 0.36 | 72.5 | 19.8 | 14.3 | 0.10 | AGGREGATED PARTICLES |

The invention claimed is:

1. A method for producing an alkaline earth metal silicate phosphor being represented by composition formula (1):

$$(Sr_aCa_bBa_cEu_d)_2Si_eO_f$$

wherein a, b, c, d, e and f satisfy $0.4<a<0.6$, $0.4<b<0.6$, $0.01<c<0.05, 0.01<d<0.4$, $0.7\leq e \leq 1.3$, $3.0\leq f \leq 5.0$ and $a+b+c+d=1$;

the method comprising:

a gel body forming step of mixing and stirring an aqueous solution of an alkaline earth metal other than barium and an europium compound, and an aqueous solution of a water-soluble silicon compound that is mixture of tetraethoxysilane and a dihydric alcohol with addition of acid as a catalyst to form a gel body;

a drying step of drying the gel body obtained in the gel body forming step;

a calcining step of calcining a dried matter obtained in the drying step in a temperature condition of from 600° C. to 1,400° C. in an air atmosphere; and a firing step of mixing a calcined powder obtained in the calcining step with a flux including at least barium chloride, followed by firing in a temperature condition of from 1,000° C. to 1,350° C. under a reducing atmosphere.

2. The method for producing an alkaline earth metal silicate phosphor according to claim 1, wherein in the gel body forming step, a gel body is formed by mixing and stirring at a solution temperature of from 20° C. to 100° C.

3. The method for producing an alkaline earth metal silicate phosphor according to claim 1, wherein a remaining flux is removed from a fired product obtained in the firing step.

4. The method for producing an alkaline earth metal silicate phosphor according to claim 2, wherein a remaining flux is removed from a fired product obtained in the firing step.

* * * * *